(12) United States Patent
Mori (10) Patent No.: US 6,243,213 B1
(45) Date of Patent: Jun. 5, 2001

(54) ZOOM LENS AND CAMERA HAVING THE ZOOM LENS

(75) Inventor: Nobuyoshi Mori, Hachioji (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/385,416

(22) Filed: Aug. 30, 1999

(30) Foreign Application Priority Data

Aug. 31, 1998 (JP) ................................. 10-245150

(51) Int. Cl.⁷ ................................. G02B 15/14
(52) U.S. Cl. .......................... 359/681; 359/689
(58) Field of Search .................. 359/683, 686, 359/689, 680, 681, 682

(56) References Cited

U.S. PATENT DOCUMENTS 5,909,318 * 6/1999 Tanaka ................. 359/689

* cited by examiner

Primary Examiner—Scott J. Sugarman
(74) Attorney, Agent, or Firm—Finnegan, Henderson, Farabow, Garrett & Dunner, L.L.P.

(57) ABSTRACT

In a zoom lens having a variable power ratio representing a ratio of a focal length at a telephoto end position to a focal length at a wide angle end position being not less than 2.5 times, the zoom lens includes, in the order named from an object side: a first lens group having a negative focal length; a second lens group having an aperture-stop and a positive focal length; and a third lens group having a positive focal length. When a magnification is varied from the wide angle end position to the telephoto end position, all of the first, second and third lens groups are moved in an optical axis direction of the zoom lens so that a distance between the first and second lens groups is decreased. The first lens group Includes, in the order named from the object side, a first positive lens whose convex surface faces the object side, a second negative meniscus lens whose convex surface faces the object side, a third negative lens, and a fourth positive lens.

21 Claims, 6 Drawing Sheets

ZOOM LENS AND CAMERA HAVING THE ZOOM LENS

BACKGROUND OF THE INVENTION

The present invention relates to a zoom lens and a camera having the zoom lens, and in particular, to a zoom lens having a magnification ratio of about 2.5 to 4 suitable for an electronic still camera or a video camera employing a solid state image sensor such as CCD.

In recent years, there has been development of rapid strides of a software handling image data, together with technical advancement and spread of a personal computer, and there is a growing demand for an electronic still camera which is used to input images in a personal computer.

As a zoom lens for a solid state image sensor, there has been disclosed a zoom lens of a three-group structure type or of a four-group structure type, wherein a zoom lens for a video camera tends to be of a high magnification ratio, and a zoom lens of a four-group structure type is widely used for the video camera, while as a zoom lens for an electronic still camera, those meeting high resolution and high image quality are demanded, and many of them have a magnification ratio, namely the ratio of a focal length at the telephoto end position to that at the wide angle end position, of about 3, and a zoom lens of a three-group structure type has been disclosed as one having the magnification ratio of about 3.

A zoom lens for a solid state image sensor having a magnification ratio-of about 3has been disclosed in each of Japanese TOKKAIHEI Nos. 10-133115, 10-39214 and 10-104518.

However, in these conventional examples, there have been problems that distortion at the wide angle end position is −5% or more (less?), or a field angle at the wide angle end position is small although distortion is small, and a total length of a lens is great.

SUMMARY OF THE INVENTION

The invention has been achieved in view of these problems, and an object of the invention is to provide a zoom lens having a small total length and a magnification ratio of 2.5 or more wherein distortion at the wide angle end position and lateral chromatic aberration are satisfactorily corrected.

The objective mentioned above can be attained by either one of the following structures.

Structure 1: A zoom lens having a variable power ratio of not less than 2.5 times which has a first lens group having a negative focal length, an aperture-stop, a second lens group having a positive focal length, and a third lens group having a positive focal length, in this order from an object, wherein when a magnification of the zoom lens is varied from the wide angle position to the telephoto end position, all of the first, second and third lens groups are moved in the direction of the optical axis of the zoom lens, and the first lens group has a first lens representing a positive lens whose convex surface faces an object, a second lens representing a negative meniscus lens whose convex surface faces an object, a third lens representing a negative lens, and a fourth lens representing a positive lens, in this order from an object.

Structure 2: The zoom lens according to Structure 1, wherein when a magnification of the zoom lens is varied from the wide angle position to the telephoto end position, the first lens group and the second lens group are moved so that a distance between the first lens group and the second lens group may be reduced.

Structure 3: The zoom lens according to Structure 1, wherein the following expressions are satisfied, $$v1>50 \tag{1}$$

$$v4>30 \tag{2}$$

where v1 and v4 represent Abbe's numbers respectively for the first lens and the fourth lens both in the first lens group.

Structure 4: The zoom lens according to Structure 1, wherein the following expression is satisfied, $$1.3<f1/fL3<2.0 \tag{3}$$

where f1 represents a focal length of the first lens group, and fL3 represents a focal length of the third lens in the first lens group.

Structure 5: The zoom lens according to Structure 1, wherein the second lens group has two negative lenses and two positive lenses, and the two positive lenses represent a lens closest to an object and a lens closest to an image both in the second lens group, and one of the two negative lenses is cemented to a positive lens.

Structure 6: The zoom lens according to Structure 1, wherein the following expression is satisfied, $$1.15<fT/|f1|<1.40 \tag{4}$$

where f1 represents a focal length of the first lens group, and fT represent a focal length of the zoom lens total system at the telephoto end position.

Structure 7: A digital still camera having therein the zoom lens of the Structure 1.

Structure 8: A video camera having therein the zoom lens of the Structure 1.

Structure 9: A zoom lens having a variable power ratio of not less than 2.5 times which has a first lens group having a negative focal length, an aperture-stop, a second lens group having a positive focal length, and a third lens group having a positive focal length, in this order from an object, wherein when a magnification of the zoom lens is varied from the wide angle position to the telephoto end position, all of the first, second and third lens groups are moved in the direction of the optical axis of the zoom lens, the second lens group has two negative lenses and two positive lenses, the two positive lenses represent a lens closest to an object and a lens closest to an image both in the second lens group, one of the two negative lenses is cemented to a positive lens, and following expression is satisfied, $$1.15<fT/|f1|<1.40$$

where fT represents a focal length of the zoom lens total system at the telephoto end position, and f1 represent a focal length of the first lens group.

Structure 10: The zoom lens according to Structure 9, wherein when a magnification of the zoom lens is varied from the wide angle position to the telephoto end position, the first lens group and the second lens group are moved so that a distance between the first lens group and the second lens group may be reduced.

Structure 11: The zoom lens according to Structure 9, wherein the following expressions are satisfied.

$$v1>50$$

$$v4>30$$

Structure 12: A digital still camera having therein the zoom lens of the Structure 9.

Structure 13: A video camera having therein the zoom lens of the Structure 9.

Structure 14: A zoom lens which has a first lens group having a negative focal length, an aperture-stop, a second lens group having a positive focal length, and a third lens group having a positive focal length, in this order from an object, wherein when a magnification of the zoom lens is varied from the wide angle position to the telephoto end position, all of the first, second and third lens groups are moved in the direction of the optical axis of the zoom lens, in which focusing is carried out by moving the third lens group in the optical axis direction, and the following conditional expression is satisfied, $$0<(D_{23T}-D_{23W})/(D_{12W}-D_{12T})<0.22$$

where $D_{12W}$ represents a distance between the first lens group and the second lens group at the wide angle end position, $D_{23W}$ represents a distance between the second lens group and the third lens group at the wide angle end position, $D_{12T}$ represents a distance between the first lens group and the second lens group at the telephoto end position, $D_{23T}$ represents a distance between the second lens group and the third lens group at the telephoto end position.

Structure 15: The zoom lens according to Structure 14, wherein when a magnification of the zoom lens is varied from the wide angle position to the telephoto end position, the first lens group and the second lens group are moved so that a distance between the first lens group and the second lens group may be reduced.

Structure 16: The zoom lens according to Structure 14, wherein the following expression is satisfied, $$1.15<fT/|f1|<1.40$$

where f1 represents a focal length of the first lens group, and fT represents a focal length of the total system of the zoom lens at the telephoto end position.

Structure 17: The zoom lens according to Structure 14, wherein the third lens group is composed of an aspherical single lens in which at least one surface has a form that makes positive refracting power of the single lens on a certain point on the surface to be smaller as that point becomes more distant from the optical axis toward the lens periphery.

Structure 18: The zoom lens according to Structure 14, wherein the second lens group has two negative lenses and two positive lenses, and the two positive lenses represent a lens closest to an object and a lens closest to an image both in the second lens group, and one of the two negative lenses is cemented to a positive lens.

Structure 19: A digital still camera having therein the zoom lens of the Structure 14.

Structure 20: A video camera having therein the zoom lens of the Structure 14.

Further, the objects mentioned above can be attained by either one of the following structures.

Namely, in a zoom lens with a magnification ratio, representing a ratio of a focal length at the telephoto end position to that at the wide angle end position, of 2.5 or more which is composed of a first lens group having a negative focal length, an aperture-stop, a second lens group having a positive focal length, and a third lens group having a positive focal length in this order from an object, wherein all of the three lens groups stated above move in the optical axis so that a distance between the first lens group and the second lens group may be reduced in the case of magnification change from the wide angle end position to the telephoto end position, the first lens group stated above is composed of a positive first lens whose convex surface faces the object, a negative meniscus-shaped second lens whose convex surface faces the object, a negative third lens and a fourth lens in this order from the object.

Or, in a zoom lens with a magnification ratio, representing a ratio of a focal length at the telephoto end position to that at the wide angle end position, of 2.5 or more which is composed of a first lens group having a negative focal length, an aperture-stop, a second lens group having a positive focal length, and a third lens group having a positive focal length in this order from an object, wherein all of the three lens groups stated above move in the optical axis so that a distance between the first lens group and the second lens group may be reduced in the case of magnification change from the wide angle end position to the telephoto end position, it is structured so that two negative lenses may be incorporated in the second lens group, a lens closest to the object and a lens closest to the image both in the second lens group may be a positive lens, and one of the two negative lenses mentioned above and one of the positive lenses in the second lens group may be cemented, and when a focal length of the first lens group and a focal length of the total system at the telephoto end position are represented respectively by f1 and fT, it is structured so that the following conditional expression may be satisfied.

$$1.15<fT/|f1|<1.40 \quad (4)$$

Further, it is structured so that a lens closest to the object and a lens closest to the image both in the first lens group may be a positive lens, and when Abbe's numbers of them are represented respectively by vf and vr, the following conditional expression may be satisfied.

$$vf>50 \quad (5)$$

$$vr<30 \quad (6)$$

Or, in a zoom lens which is composed of a first lens group having a negative focal length, an aperture-stop, a second lens group having a positive focal length, and a third lens group having a positive focal length in this order from an object, wherein all of the three lens groups stated above move in the optical axis so that a distance between the first lens group and the second lens group may be reduced in the case of magnification change from the wide angle end position to the telephoto end position and focusing is performed by moving the third lens group in the optical axis, it is structured so that when $D_{12W}$ represents a distance between the first lens group and the second lens group at the wide angle end position and $D_{23W}$ represents the distance between the second lens group and the third lens group at the wide angle end position, $D_{12T}$ represents the distance between the first lens group and the second lens group at the telephoto end position, and $D_{23T}$ represents the distance between the second lens group and the third lens group at the telephoto end position, the following conditional expression may be satisfied.

$$0<(D_{23T}-D_{23W})/(D_{12W}-D_{12T})<0.22 \quad (7)$$

Incidentally, a variable power ratio in the invention represents (a focal length at a telephoto end position/a focal length at a wide angle end position).

"A lens group" in the invention represents a combination of lenses which are moved solidly in the course of magnification change (zooming) or focusing. Further, a lens group may be composed either of one lens or of plural lenses.

In the aforesaid structure wherein the first lens group having the negative focal length, the aperture-stop, the second lens group having the positive focal length, and the third lens group having the positive focal length, when trying to obtain a zoom lens having the magnification ratio of 2.5 or more in which all of the three lens groups stated above are moved in the optical axis direction so that the distance between the first lens group and the second lens group may be reduced in the case of changing magnification from the wide angle end position to the telephoto end position, greater negative distortion at the wide angle end position can not be avoided. However, when the first lens group is made to be composed of a first lens whose convex surface faces an object, a second lens having a negative meniscus form whose convex surface faces the object, a negative third lens and a positive fourth lens, the negative distortion at the wide angle end position can be corrected satisfactorily.

Incidentally, it is preferable that the first lens group is composed only of four lenses representing a first lens—a fourth lens.

In the case of a zoom lens which is generally composed of a negative lens group, an aperture-stop, and positive second and third lens groups in this order, a back focus is long at the telephoto end position. Therefore, lateral chromatic aberration generated at the rear side of the stop is greater at the telephoto end position than at the wide angle end position, and correction of the first lens group is not sufficient because an incident field angle is small at the telephoto end position, and it is excessive at the wide angle end position. It is therefore preferable that lateral chromatic aberration is corrected for each of the first lens group and the second lens group separately.

Lateral chromatic aberration generated on the negative lens in the first lens group is negative lateral chromatic aberration wherein an image by short wavelength light is made to be small, and correction thereof is made by positive lateral chromatic aberration generated on the positive lens in the first lens group. In this case, when conditional expressions (1) and (2) are satisfied, the lateral chromatic aberration can be corrected satisfactorily.

When refracting power is distributed to satisfy the conditional expression (3), a light flux resulted from diversion by the third lens can pass to be away from the optical axis of the aforesaid fourth lens, which enhances an effect of correction of the lateral chromatic aberration of the fourth lens, and coma and astigmatism may be made smaller, which is preferable.

When an arrangement is made so that the second lens group includes two negative lenses, a lens closest to an object and a lens closest to an image both in the second lens group are a positive lens, and one of the aforesaid two negative lenses is cemented with a positive lens of the second lens group, refracting power distribution in the second lens group is made to be of the so-called triplet structure which roughly represents positive/negative/positive, and Petzval sum can be made small, and a curved image plane can be corrected satisfactorily.

Incidentally, a positive lens to which one of two negative lenses in the second lens group is cemented may be any of those including a positive lens closest to an object in the second lens group, a lens closest to an image in the second lens group, and other positive lens in the second lens group.

By splitting the negative refracting power into two and by making one of the two to be cemented with the positive lens, it is possible to lessen an inclination of an image plane caused by eccentricity of the lens in the second lens group, and to lessen single-sided unsharpness which is resulted from the inclination of an image plane, thus, a lens which is easy to assemble can be obtained. Though the Petzval sum and an effect of the eccentricity have been lessened by making the radius of curvature large and thereby by making the thickness on the optical axis of the lens large, it is possible, due to the structure mentioned above, to make the second lens group compact without necessity to make the lens to be thick in particular. Due to this, a zoom lens wherein a distance between its lens groups can be shortened when the zoom lens is carried makes it possible to obtain a compact lens which is short in length when it is carried and to obtain a thin camera.

When the refracting power of the first lens group is further established to satisfy the conditional expression (4), a total length of the lens and distortion at the wide angle end position can be corrected in a well-balanced way.

When an arrangement is made so that a lens closest to an object and a lens closest to an image both in the first lens group are a positive lens, and Abbe's numbers of them are set to satisfy respectively the conditional expressions (5) and (6), negative distortion at the wide angle end position and lateral chromatic aberration can be corrected satisfactorily.

Further, in a zoom lens which is composed of a first lens group having a negative focal length, an aperture-stop, a second lens group having a positive focal length, and a third lens group having a positive focal length in this order from an object, wherein all of the three lens group stated above move in the optical axis so that a distance between the first lens group and the second lens group may be reduced in the case of magnification change from the wide angle end position to the telephoto end position and focusing is performed by moving the third lens group in the optical axis, when $D_{12W}$ represents a distance between the first lens group and the second lens group at the wide angle end position and $D_{23W}$ represents the distance between the second lens group and the third lens group at the wide angle end position, $D_{12T}$ represents the distance between the first lens group and the second lens group at the telephoto end position, and $D_{23T}$ represents the distance between the second lens position and the third lens group at the telephoto end position, it is possible to make the sum total of an amount of movement of the third lens group against the second lens group for magnification change and focusing to be small, when the third lens group is moved to satisfy the conditional expression (7), and to obtain a zoom lens wherein a difference between the distortion at the wide angle end position and that at the telephoto end position is small.

Incidentally, it is preferable that the third lens group only is moved for focusing.

In a zoom lens where focusing for an object which is away by a limited distance is conducted by moving the third lens group toward the object in the invention, an amount of the movement at the telephoto end position is greater than that at the wide angle end position. In the case of magnification change from the wide angle end to the telephoto end position, when the third lens group is moved so that it may leave the second lens group relatively, a difference of the relative position of the third lens group between the occasion where the third lens group is closest to the second lens group and the occasion where the third lens group is farthest from the second lens group for magnification change and focusing is made to be small, offsetting a large amount of focusing movement at the telephoto end position. It is therefore possible to make a driving means for the third lens group to be small, by an arrangement wherein the second lens group has therein the driving means for the third lens group and the driving means is moved solidly with the second lens group for magnification change.

The distortion takes a positive value at the telephoto end position, and generation of the positive distortion can be controlled when the third lens group is moved to leave the second lens group, namely to leave the aperture-stop, thus, it is possible to obtain a zoom lens wherein a value of distortion and its fluctuation are small for the area from the wide angle end position to the telephoto end position.

Further, if at least one surface of the third lens group is structured with a single lens having an aspherical surface in a form wherein positive refracting power at a certain point is smaller as that point moves from the optical axis toward the lens periphery, the driving means for the third lens group can be made small, and negative distortion at the wide angle end position can be made small.

Incidentally, in the invention, all of the first, second and third lens groups are moved in the optical axis direction, when a magnification of a zoom lens is varied (zooming).

When a magnification of the zoom lens is varied from a wide angle end position to a telephoto end position, it is preferable that the first lens group and the second lens group are moved so that a distance between the first lens group and the second lens group may be reduced. In this case, when a magnification of the zoom lens is varied from a wide angle end position to a telephoto end position, it is preferable that the first lens group is moved toward an image up to the middle and then is moved toward an object, although the first lens group may be moved toward an image only. The third lens group may either be moved only toward an image, or be moved toward an image up to the middle and then is moved toward an object.

When a magnification of the zoom lens is varied from a wide angle end position to a telephoto end position, it is also possible to move the first lens group and the second lens group so that a distance between the first lens group and the second lens group is decreased up to the middle, and then is increased. In this case again, when a magnification of the zoom lens is varied from a wide angle end position to a telephoto end position, it is more preferable to move the first lens group toward an image up to the middle, and then to move it toward an object, although the first lens group may be moved toward an image only. The third lens group may either be moved only toward an image, or be moved toward an image up to the middle and then is moved toward an object.

A zoom lens of the invention may also have three or more lens groups. When it has three or more lens groups, it is preferable that a fourth lens group is arranged to be closer to an image than a third lens group is, when the fourth lens group is provided. When a fifth lens group is provided, it is preferably arranged to be closer to an image than the fourth lens group is.

In the zoom lens of the invention, it is preferable that all lenses are made of glass, but a lens of the third lens group and two lenses cemented with each other in the second lens group may also be a plastic lens.

It is especially preferable that the zoom lens of the invention is used in a camera employing a solid state image sensor such as a digital still camera and a video camera. In particular, it is more preferable when high fineness of 500,000 pixels, preferably of 1,000,000 pixels is required, as in the case of a digital camera.

The zoom lens of the invention is especially suitable for a digital still camera which is of a collapsible mount type wherein a length of a lens barrel is changed between photographing and non-photographing, or is changed when a magnification is varied, and is suitable for a video camera. Incidentally, as a solid state image sensor for a digital still camera and a video camera, CCD or CMOS can be used.

A digital camera or a video camera which is right fit for the zoom lens of the invention is provided with an optical system wherein two units, namely, a unit including the first lens group and a unit including the second and third lens groups are moved by a driving device such as a motor and a cam, and a second motor for driving the third lens group is provided in the latter unit to move the third lens group in the case of magnification change or focusing, the image sensor mentioned above, CPU which calculates image signals from the image sensor stated above and converts image recording signals, a device for storing the image recording signals together with CPU which judges focusing and controls a movement of the third lens group and with an optical view-finder, or with an image display device such as LCD which monitors image signals.

BRIEF DESCRIPTION OF THE DRAWINGS

Each of FIGS. 1(a) and 1(b) shows a sectional view and where each lens group moves for magnification change, respectively at the wide angle end position 1(a) and the telephoto end position 1(b) in Example 1.

Each of FIGS. 2(a)-1 to 2(a)-4, 2(b)-1 to 2(b)-4, and 2(c)-1 to 2(c)-4 shows an aberration diagram, respectively at the wide angle end position W, intermediate position M and the telephoto end position T in Example 1.

Each of FIGS. 4(a)-1 to 4(a)-4, 4(b)-1 to 4(b)-4, and 4(c)-1 to 4(c)-4 shows an aberration diagram, respectively at the wide angle end position W, intermediate position M and the telephoto end position T in Example 2.

Each of FIGS. 6(a)-1 to 6(a)-4, 6(b)-1 to 6(b)-4, and 6(c)-1 to 6(c)-4 shows an aberration diagram, respectively at the wide angle end position W, intermediate position M and the telephoto end position T in Example 3.

DETAILED DESCRIPTION OF THE PREFERRED EMBODIMENT

Examples of a camera lens of the invention will be shown as follows. Symbols in each example are as follows.

f: Focal length of the total system

Fno: F-number $\omega$: Half field angle

R: Radius of curvature of refraction surface

D: Distance between surfaces of refraction

Nd: Refractive index on d-line of lens material $\nu$d: Abbe's number of lens material f1: Focal length of the first lens group fL3: Focal length of the third lens in the first lens group fT: Focal length of the total system at the telephoto end position $\nu$1: Abbe's number of the first lens in the first lens group $\nu$4: Abbe's number of the fourth lens in the first lens group $\nu$r: Abbe's number of the lens closest to an object in the first lens group $\nu$f: Abbe's number of the lens closest to an image in the first lens group $D_{12W}$: Distance between the first lens group and the second lens group at the wide angle end position $D_{23W}$: Distance between the second lens group and the third lens group at the wide angle end position $D_{12T}$: Distance between the first lens group and the second lens group at the telephoto end position $D_{23T}$: Distance between the second lens group and the third lens group at the telephoto end position A form of the aspherical surface is expressed by the following expression, when an X-axis is in the optical axis direction in the coordinates, and h represents a height in the direction perpendicular to the optical axis. Incidentally, K in the following expression represents a conical constant, and $A_4$, $A_6$, $A_8$ and $A_{10}$ show an aspherical surface coefficient.

$$x = \frac{h^2/R}{1+\sqrt{1-(K+1)h^2/R^2}} + A_4 \cdot h^4 + A_6 \cdot h^6 + A_8 \cdot h^8 + A_{10} \cdot h^{10}$$

EXAMPLE 1

Figures 1A, 1B:
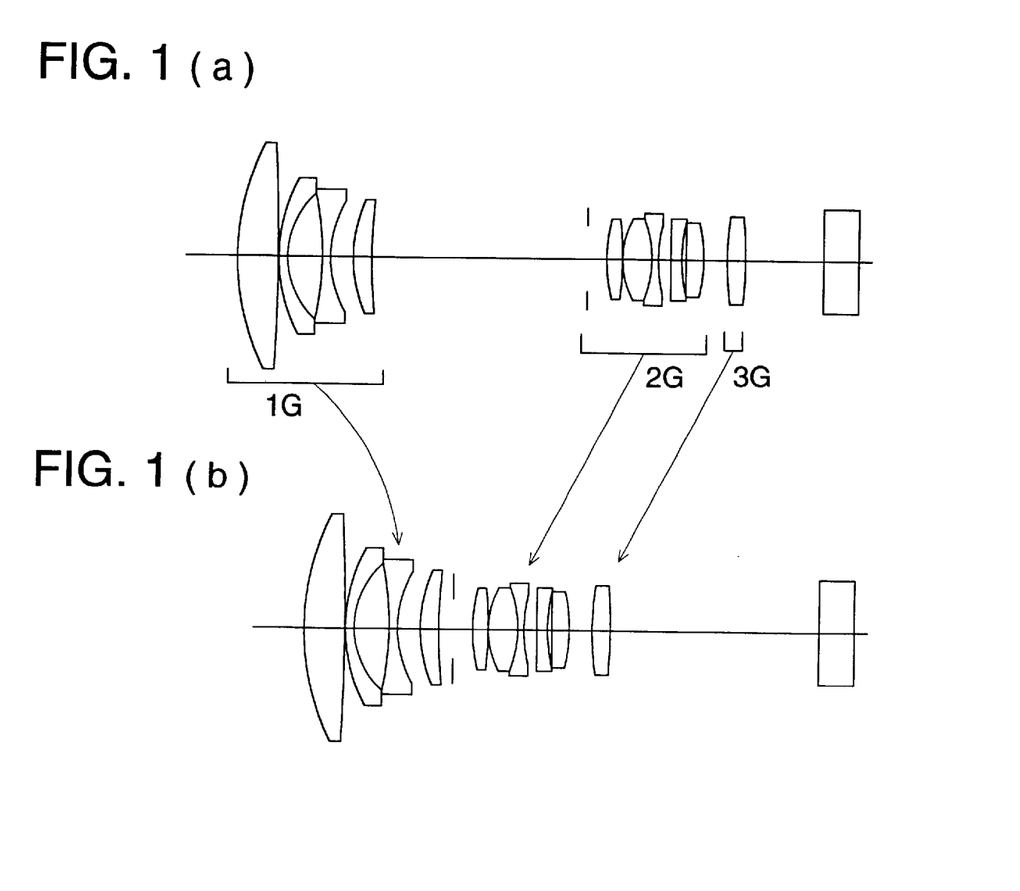
Figure 2A:
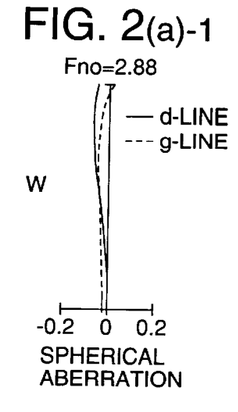
Figure 2A:
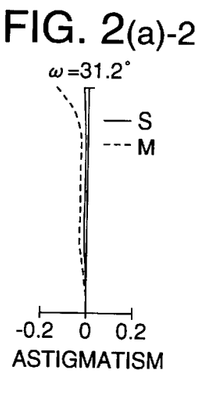
Figure 2A:
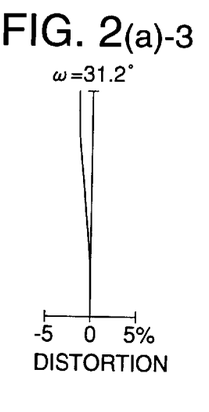
Figure 2A:
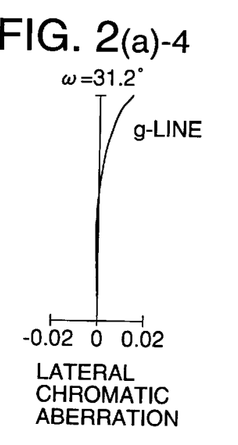
Figure 2B:
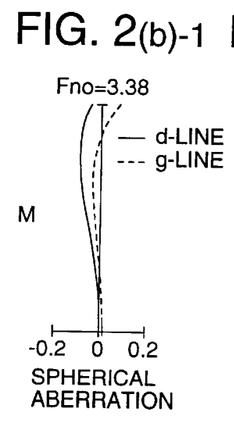
Figure 2B:
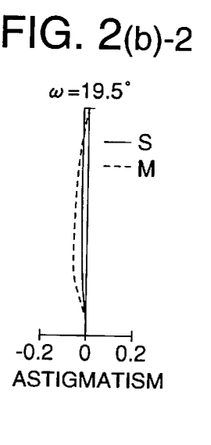
Figure 2B:
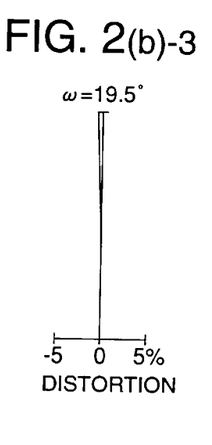
Figure 2B:
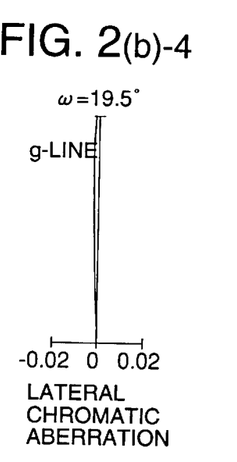
Figure 2C:
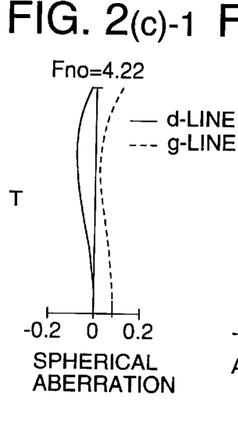
Figure 2C:
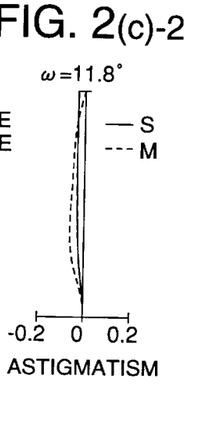
Figure 2C:
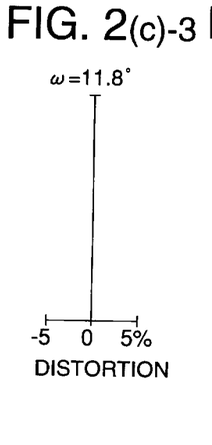
Figure 2C:
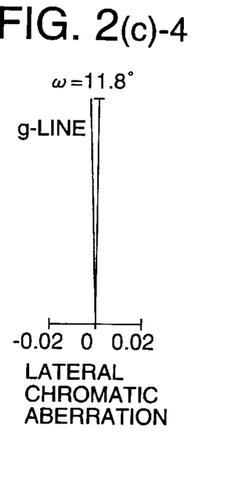

FIG. 1 shows how Example 1 is structured. The lens second from the left in 2G in the diagram is cemented to the lens which is third from the left.

TABLE 1 f = 7.153–20.207, Fno = 2.88–4.22, ω = 31.2°–11.8°

| Surface Nos. | R | D | Nd | υd |
|---|---|---|---|---|
| 1 | 25.077 | 3.90 | 1.51633 | 64.1 |
| 2 | −200.706 | 0.20 | | |
| 3 | 15.899 | 0.80 | 1.77250 | 49.6 |
| 4 | 8.698 | 3.50 | | |
| 5 | −26.787 | 0.80 | 1.79952 | 42.2 |
| 6 | 10.300 | 2.40 | | |
| 7 | 14.697 | 1.70 | 1.84666 | 23.8 |
| 8 | 52.141 | A | | |
| 9 | 19.581 | 1.40 | 1.77250 | 49.6 |
| 10 | −54.557 | 0.20 | | |
| 11 | 10.409 | 2.70 | 1.71300 | 53.9 |
| 12 | −10.409 | 0.60 | 1.78590 | 44.2 |
| 13 | 14.693 | 1.30 | | |
| 14 | −149.691 | 1.00 | 1.84666 | 23.8 |
| 15 | 12.811 | 0.45 | | |
| 16 | 111.789 | 1.75 | 1.65844 | 50.9 |
| 17 | −15.507 | B | | |
| 18* | 35.368 | 1.70 | 1.58913 | 61.2 |
| 19 | −47.913 | C | | |
| 20 | ∞ | 3.46 | 1.51633 | 64.1 |
| 21 | ∞ | fb | | |

A mark * represents an aspherical surface.

TABLE 2

Aspherical surface coefficient on the 18th surface

K = 2.22350
$A_4 = -5.34760 \times 10^{-5}$
$A_6 = -3.03750 \times 10^{-6}$
$A_8 = 6.64030 \times 10^{-8}$

TABLE 3

| | Focal length | ω | Fno | A | B | C | fb |
|---|---|---|---|---|---|---|---|
| Wide angle end position | 7.153 | 31.2° | 2.88 | 23.210 | 2.359 | 7.933 | 1.25 |
| Intermediate position | 12.000 | 19.5° | 3.38 | 10.737 | 2.954 | 12.237 | 1.25 |
| Telephoto end position | 20.207 | 11.8° | 4.22 | 3.100 | 3.250 | 20.030 | 1.25 |

A, B and C are described in Table 1.

f1/fL3=1.67 fT/|f1|=1.31

ν1=νf=64.1

ν4=νr=23.8

$(D_{23T}-D_{23W})/(D_{12W}-D_{12T})=0.044$

EXAMPLE 2

Figure 3:
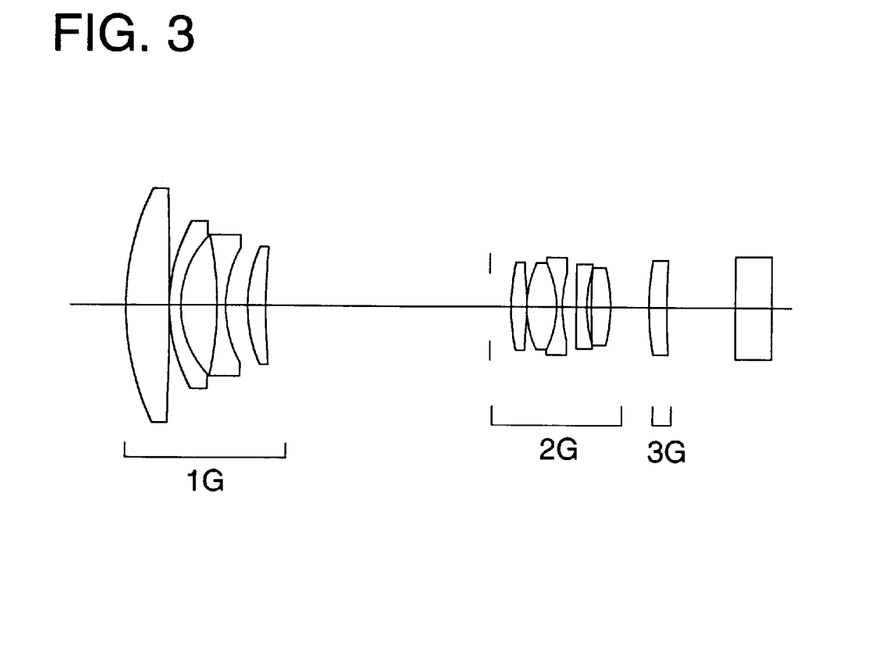
FIG. 3 is a sectional view at the wide angle end position of the lens in Example 2.
Figure 4A:
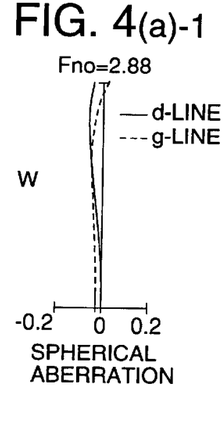
Figure 4A:
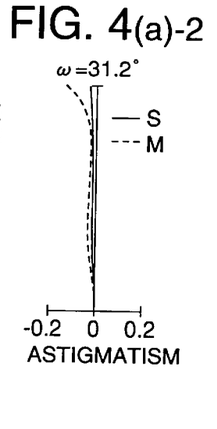
Figure 4A:
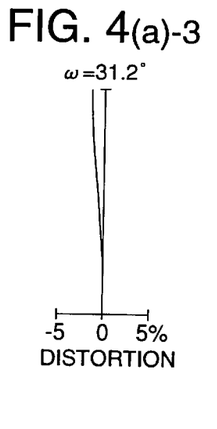
Figure 4A:
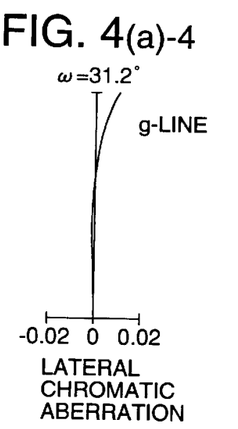
Figure 4B:
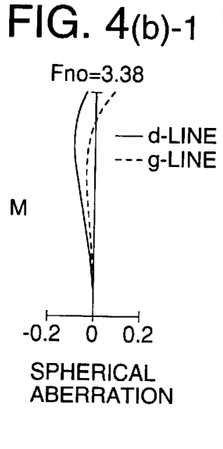
Figure 4B:
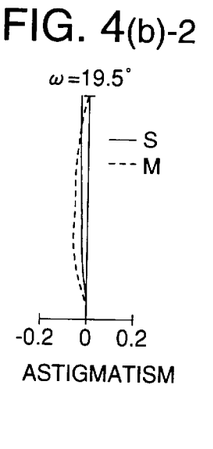
Figure 4B:
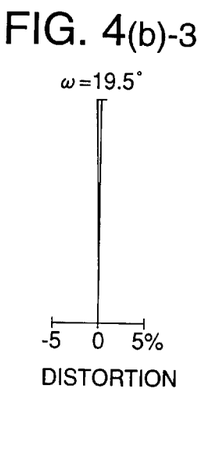
Figure 4B:
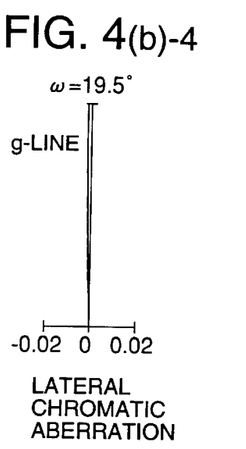
Figure 4C:
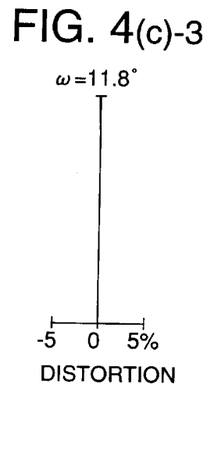
Figure 4C:
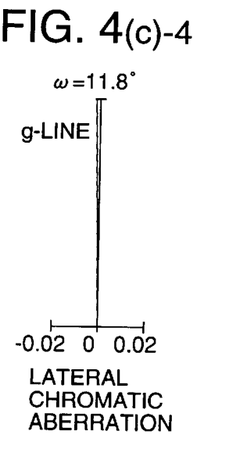
Figures 4C, 4C:
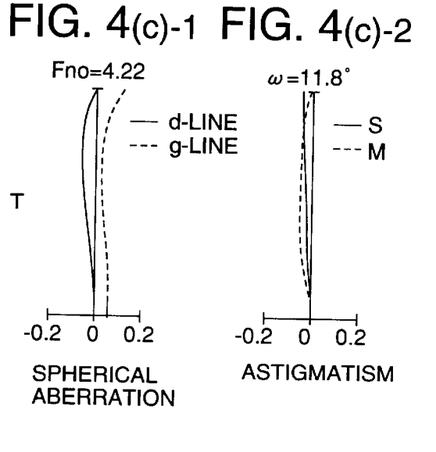

FIG. 3 shows how Example 2 is structured. The lens second from the left in 2G in the diagram is cemented to the lens which is third from the left.

TABLE 2 f = 7.157–20.193, Fno = 2.88–4.22, ω = 31.2°–11.8°

| Surface Nos. | R | D | Nd | υd |
|---|---|---|---|---|
| 1 | 25.532 | 3.90 | 1.51633 | 64.1 |
| 2 | −321.251 | 0.20 | | |
| 3 | 17.343 | 0.80 | 1.77250 | 49.6 |
| 4 | 9.050 | 3.50 | | |
| 5 | −35.920 | 0.80 | 1.79952 | 42.2 |
| 9 | 9.996 | 2.36 | | |
| 7 | 14.061 | 1.70 | 1.84666 | 23.8 |
| 8 | 43.991 | A | | |
| 9 | 19.433 | 1.40 | 1.77250 | 49.6 |
| 10 | −55.506 | 0.20 | | |
| 11 | 10.603 | 2.70 | 1.71300 | 53.9 |
| 12 | 9.410 | 0.60 | 1.78590 | 44.2 |
| 13 | 15.064 | 1.34 | | |
| 14 | −1009.747 | 1.00 | 1.84666 | 23.8 |
| 15 | 12.309 | 0.45 | | |
| 16 | 58.380 | 1.75 | 1.65844 | 50.9 |
| 17 | 14.722 | B | | |
| 18* | 23.468 | 1.70 | 1.58913 | 61.2 |
| 19 | 144.342 | C | | |
| 20 | ∞ | 3.46 | 1.51633 | 64.1 |
| 21 | ∞ | fb | | |

A mark * represents an aspherical surface.

TABLE 5

Aspherical surface coefficient on the 18th surface

K = 1.27136
$A_4 = -6.38713 \times 10^{-5}$
$A_6 = -2.49228 \times 10^{-6}$
$A_8 = 4.87081 \times 10^{-8}$

TABLE 6

| | Focal length | ω | Fno | A | B | C | fb |
|---|---|---|---|---|---|---|---|
| Wide angle end position | 7.157 | 31.2° | 2.88 | 23.381 | 3.782 | 6.385 | 1.25 |
| Intermediate position | 12.000 | 19.5° | 3.38 | 10.848 | 4.668 | 10.295 | 1.25 |
| Telephoto end position | 20.193 | 11.8° | 4.22 | 3.100 | 5.000 | 17.797 | 1.25 |

A, B and C are described in Table 4.

f1/fL3=1.62 fT/|f1|=1.29

ν1=νf=64.1

ν4=νr=23.8

$(D_{23T}-D_{23W})/(D_{12W}-D_{12T})=0.06$

EXAMPLE 3

Figure 5:
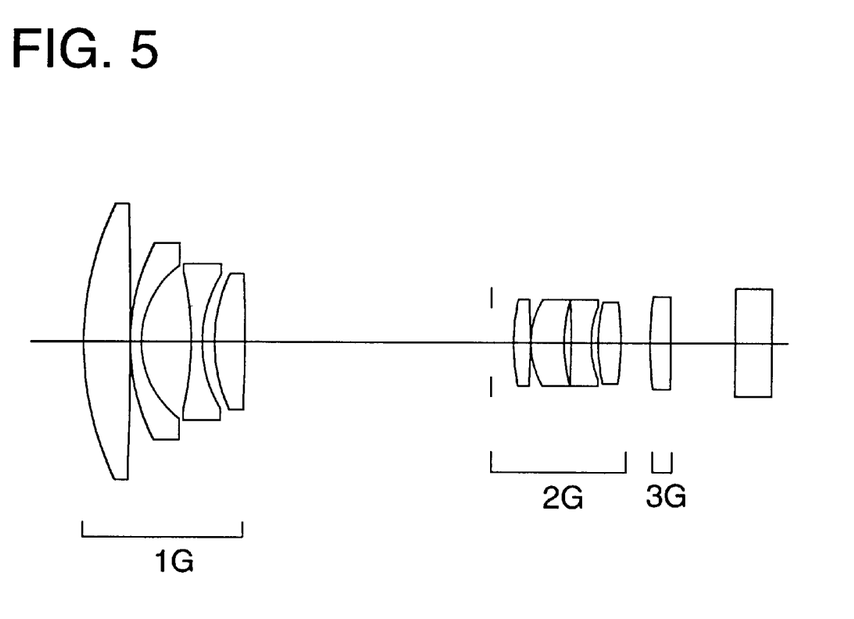
FIG. 5 is a sectional view at the wide angle end position of the lens in Example 3.
Figure 6A:
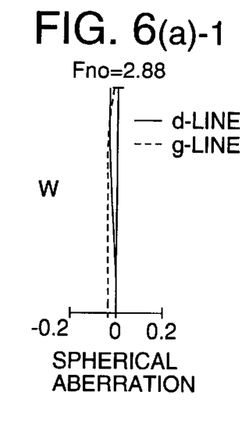
Figure 6A:
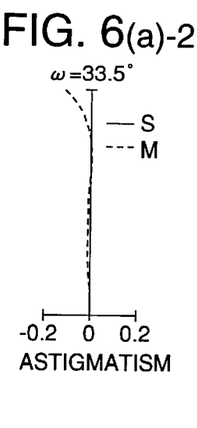
Figure 6A:
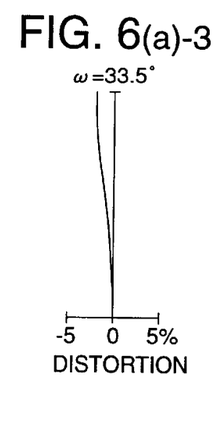
Figure 6A:
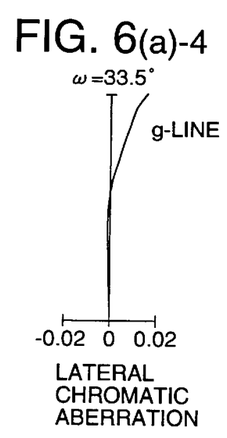
Figure 6B:
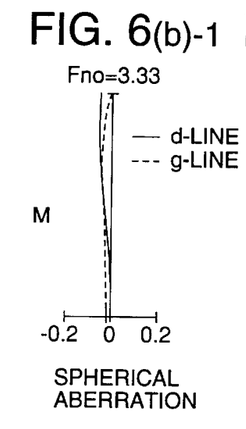
Figure 6B:
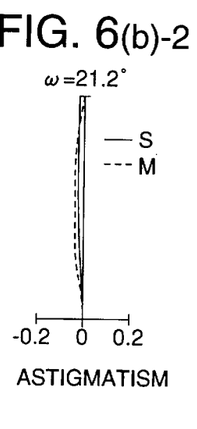
Figure 6B:
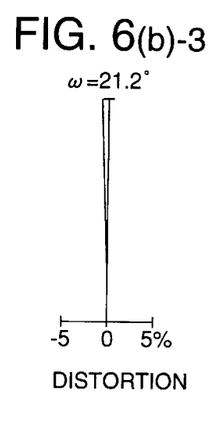
Figure 6B:
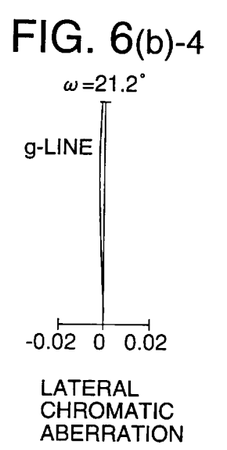
Figure 6C:
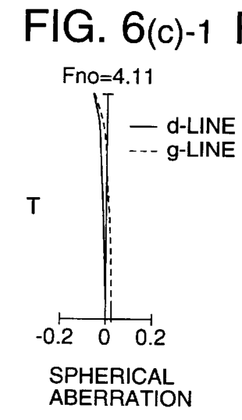
Figure 6C:
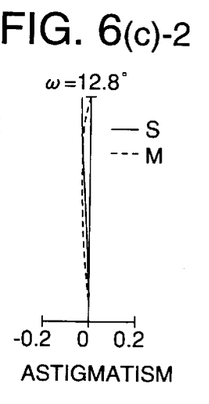
Figure 6C:
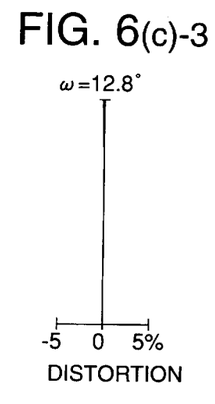
Figure 6C:
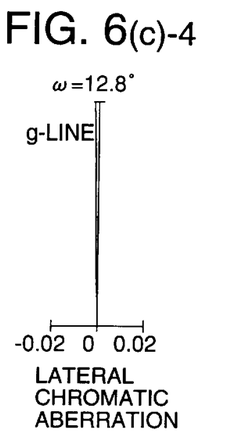

FIG. 5 shows how Example 3 is structured. There are no lenses cemented in 2G in FIG. 5.

TABLE 7

$f = 6.609–18.600$, Fno = 2.88–4.11, $\omega = 33.5°$—$12.8°$

| Surface Nos. | R | D | Nd | νd |
|---|---|---|---|---|
| 1 | 28.712 | 4.00 | 1.51633 | 64.1 |
| 2 | −473.079 | 0.22 | | |
| 3 | 19.878 | 1.00 | 1.78590 | 44.2 |
| 4 | 8.873 | 4.60 | | |
| 5 | −25.495 | 0.90 | 1.83400 | 37.2 |
| 6 | 10.955 | 1.10 | | |
| 7 | 13.376 | 2.75 | 1.84666 | 23.8 |
| 8 | 2254.800 | A | | |
| 9 | 18.228 | 1.40 | 1.77250 | 49.6 |
| 10 | −66.191 | 0.20 | | |
| 11 | 8.568 | 2.84 | 1.71300 | 53.9 |
| 12 | 12.923 | 0.60 | | |
| 13 | −238.459 | 1.82 | 1.84666 | 23.8 |
| 14 | 8.300 | 0.70 | | |
| 15 | 18.845 | 1.98 | 1.65844 | 50.9 |
| 16 | −28.615 | B | | |
| 17* | 22.498 | 1.98 | 1.58913 | 61.2 |
| 18 | −144.683 | C | | |
| 19 | ∞ | 3.46 | 1.51633 | 64.1 |
| 20 | ∞ | fb | | |

A mark * represents an aspherical surface.

TABLE 8

Aspherical surface coefficient on the 17th surface $K = -1.91260 \times 10^{-4}$
$A_4 = -7.29770 \times 10^{-5}$
$A_6 = -3.46140 \times 10^{-6}$
$A_8 = 1.13630 \times 10^{-7}$

TABLE 9

| | Focal length | ω | Fno | A | B | C | fb |
|---|---|---|---|---|---|---|---|
| Wide angle end position | 6.609 | 33.5° | 2.88 | 24.605 | 2.700 | 5.816 | 1.25 |
| Intermediate position | 11.000 | 21.2° | 3.33 | 11.248 | 2.884 | 9.570 | 1.25 |
| Telephoto end position | 18.600 | 12.8° | 4.11 | 3.000 | 3.241 | 16.143 | 1.25 |

A, B and C are described in Table 7.

f1/fL3=1.75 fT/|f1|=1.17

ν1=νf=64.1

ν4=νr=23.8

$(D_{23T}-D_{23W})/(D_{12W}-D_{12T})=0.025$

Since the zoom lens of the invention was structured as stated above, it was possible to obtain a compact lens whose thickness on the optical axis of the second lens group and that on the optical axis of the third lens group are small as shown in the diagram of the sectional view and in the diagram of the aberration, and it was possible to obtain a zoom lens corrected excellently in terms of distortion at the wide angle end position to the telephoto end position. It was also possible to obtain a zoom lens which is satisfactorily corrected in terms of lateral chromatic aberration, and is suitable, with its small pixel pitch and high resolution, for a camera lens for CCD. It was further possible to obtain a zoom lens which is easy to manufacture, because two negative lenses are used in the second lens group and one of them is cemented to reduce deterioration of image quality caused by eccentricity of the lens in the second lens group.

A camera of the invention equipped with the zoom lens stated above has made it possible to materialize a camera which is provided with the effect stated above and is compact.

By using a zoom lens of the invention, it is possible to obtain an excellent telecentric property. It is further possible to provide a zoom-lens-fitted digital camera of a collapsible mount type wherein the total length of a lens barrel can be changed in the case of zooming and a zoom-lens-fitted video camera.

Disclosed embodiment can be vvaried by a skilled person without departing from the spirit and scope of the invention.

What is claimed is:

1. A zoom lens having a variable power ratio representing a ratio of a focal length at a telephoto end position to a focal length at a wide angle end position being not less than 2.5 times, the zoom lens comprising, in the order named from an object side:

(a) a first lens group having a negative focal length;

(b) an aperture-stop;

(c) a second lens group having a positive focal length; and (d) a third lens group having a positive focal length;

wherein when a magnification is varied from the wide angle end position to the telephoto end position, all of the first, second and third lens groups are moved in a direction of an optical axis of the zoom lens;

wherein the first lens group comprises, in the order named from the object side, a first positive lens whose convex surface faces the object side, a second negative meniscus lens whose convex surface faces the object side, a third negative lens, and a fourth positive lens; and wherein the following expressions are satisfied:

ν1>50

ν4<30 wherein ν1 and ν4 represent Abbe's numbers, respectively, for the first and fourth lenses in the first lens group.

2. The zoom lens of claim 1, wherein when the magnification is varied from the wide angle end position to the telephoto end position, the first and second lens groups are moved in the direction of the optical axis so that a distance between the first and second lens groups is decreased.

3. The zoom lens of claim 1, wherein the following expression is satisfied, 1.3<f1/fL3<2.0 where f1 represents a focal length of the first lens group, and fL3 represents a focal length of the third lens in the first lens group.

4. The zoom lens of claim 1, wherein the second lens group comprises two negative lenses and two positive lenses, the two positive lenses representing a lens positioned closest to the object side and a lens positioned closest to an image side, and one of two negative lenses and a positive lens in the second lens group are cemented together.

5. The zoom lens of claim 1, wherein the following expression is satisfied, $$1.15 < fT/|f1| < 1.40$$

where f1 represents a focal length of the first lens group, and fT represents a focal length of an entire zoom lens system at the telephoto end position.

6. A digital still camera including a zoom lens having a variable power ratio representing a ratio of a focal length at a telephoto end position to a focal length at a wide angle end position being not less than 2.5 times, the zoom lens comprising, in the order named from an object side:

(a) a first lens group having a negative focal length;

(b) an aperture-stop;

(c) a second lens group having a positive focal length; and (d) a third lens group having a positive focal length;

wherein when a magnification is varied from the wide angle end position to the telephoto end position, all of the first, second and third lens groups are moved in a direction of an optical axis of the zoom lens;

wherein the first lens group comprises, in the order named from the object side, a first positive lens whose convex surface faces the object side, a second negative meniscus lens whose convex surface faces the object side, a third negative lens, and a fourth positive lens; and wherein the following expressions are satisfied:

$$v1 > 50$$

$$v4 < 30$$

where v1 and v4 represent Abbe's numbers, respectively, for the first and fourth lenses in the first lens group.

7. A video camera including a zoom lens having a variable power ratio representing a ratio of a focal length at a telephoto end position to a focal length at a wide angle end position being not less than 2.5 times, the zoom lens comprising, in the order named from an object side:

(a) a first lens group having a negative focal length;

(b) an aperture-stop;

(c) a second lens group having a positive focal length; and (d) a third lens group having a positive focal length, wherein when a magnification is varied from the wide angle end position to the telephoto end position, all of the first, second and third lens groups are moved in a direction of an optical axis of the zoom lens;

wherein the first lens group comprises, in the order named from the object side, a first positive lens whose convex surface faces the object side, a second negative meniscus lens whose convex surface faces the object side, a third negative lens, and a fourth positive lens; and wherein the following expressions are satisfied:

$$v1 > 50$$

$$v4 < 30$$

wherein v1 and v4 represent Abbe's numbers, respectively, for the first and fourth lenses in the first lens group.

8. A zoom lens having a variable power ratio representing a ratio of a focal length at a telephoto end position to a focal length at a wide angle end position being not less than 2.5 times, the zoom lens comprising, in the order named from an object side:

(a) a first lens group having a negative focal length;

(b) an aperture-stop;

(c) a second lens group having a positive focal length; and (d) a third lens group having a positive focal length;

wherein when a magnification is varied from the wide angle end position to the telephoto end position, all of the first, second and third lens groups are moved in a direction of an optical axis of the zoom lens;

wherein the second lens group comprises a negative lens and two positive lenses, one of the two positive lenses representing a lens positioned closest to the object side in the second lens group; and wherein the following expression is satisfied:

$$1.15 < fT/|f1| < 1.40$$

where f1 represents a focal length of the first lens group, and fT represents a focal length of an entire zoom lens system at the telephoto end position.

9. The zoom lens of claim 8 wherein when the magnification is varied from the wide angle end position to the telephoto end position, the first and second lens groups are moved in the direction of the optical axis so that a distance between the first and second lens groups is decreased.

10. The zoom lens of claim 8, wherein the following expressions are satisfied, $$v1 > 50,$$

$$v4 < 30$$

where v1 and v4 represent Abbe's numbers, respectively for the first and fourth lenses in the first lens group.

11. The zoom lens of claim 8, wherein the negative lens and one of the two positive lens in the second lens group are cemented together.

12. The zoom lens of claim 8, wherein the second lens group further comprises another negative lens and wherein the other of the two positive lenses represents a lens positioned closest to an image side in the second lens group.

13. A digital still camera including a zoom lens having a variable power ratio representing a ratio of a focal length at a telephoto end position to a focal length at a wide angle end position being not less than 2.5 times, the zoom lens comprising, in the order named from an object side:

(a) a first lens group having a negative focal length;

(b) an aperture-stop;

(c) a second lens group having a positive focal length; and (d) a third lens group having a positive focal length;

wherein when a magnification is varied from the wide angle end position to the telephoto end position, all of the first, second and third lens groups are moved in a direction of an optical axis of the zoom lens;

wherein the second lens group comprises a negative lens and two positive lenses, one of the two positive lenses representing a lens positioned closest to the object side in the second lens group; and wherein the following expression is satisfied:

$$1.15 < fT/|f1| < 1.40$$

where f1 represents a focal length of the first lens group, and fr represents a focal length of an entire zoom lens system at the telephoto end position.

14. A video camera including a zoom lens having a variable power ratio representing a ratio of a focal length at a telephoto end position to a focal length at a wide angle end position being not less than 2.5 times, the zoom lens comprising, in the order named from an object side:
(a) a first lens group having a negative focal length;
(b) an aperture-stop;
(c) a second lens group having a positive focal length; and
(d) a third lens group having a positive focal length;
wherein when a magnification is varied from the wide angle end position to the telephoto end position, all of the first, second and third lens groups are moved in a direction of an optical axis of the zoom lens;
wherein the second lens group comprises a negative lens and two positive lenses, one of the two positive lenses representing a lens positioned closed to the object side in the second lens group; and
wherein the following expression is satisfied:

$$1.15 < fT/|f1| < 1.40$$

where f1 represents a focal length of the first lens group, and fT represents a focal length of an entire zoom lens system at the telephoto end position.

15. A zoom lens comprising, in the order named from an object side:
(a) a first lens group having a negative focal length;
(b) an aperture-stop;
(c) a second lens group having a positive focal length; and
(d) a third lens group having a positive focal length,
wherein when a magnification is varied from the wide angle end position to the telephoto end position, all of the first, second and third lens groups are moved in a direction of an optical axis of the zoom lens,
wherein a focusing operation is carried out by moving the third lens group in the direction of the optical axis of the zoom lens, and
wherein the following expression is satisfied, $$0 < (D_{23T} - D_{23W})/(D_{12W} - D_{12T}) < 0.22$$

where $D_{12W}$ represents a distance between the first and second lens groups at a wide angle end position, $D_{23W}$ represents a distance between the second and third lens groups at the wide angle end position, $D_{12T}$ represents a distance between the first and second lens groups at a telephoto end position, $D_{23T}$ represents a distance between the second and third lens groups at the telephoto end position.

16. The zoom lens of claim 15, wherein when a magnification of the zoom lens is varied from the wide angle end position to the telephoto end position, the first and second lens groups are moved so that a distance between the first and second lens groups is decreased.

17. The zoom lens of claim 15, wherein the following expression is satisfied, $$1.15 < fT/|f1| < 1.40$$

where f1 represents a focal length of the first lens group, and fT represents a focal length of an entire zoom lens system at the telephoto end position.

18. The zoom lens of claim 15, wherein the third lens group comprises an aspherical single lens in which as a point on at least one surface of the single lens is moved from the optical axis to a periphery of the single lens, positive refracting power of the single lens is decreased.

19. The zoom lens of claim 15, wherein the second lens group comprises two negative lenses and two positive lenses, the two positive lenses representing a lens positioned closest to the object side and a lens positioned closest to an image side, and one of two negative lenses and a positive lens in the second lens group are cemented together.

20. A digital still camera including a zoom lens comprising, in the order named from an object side:
(a) a first lens group having a negative focal length;
(b) an aperture-stop;
(c) a second lens group having a positive focal length; and
(d) a third lens group having a positive focal length,
wherein when a magnification is varied from the wide angle end position to the telephoto end position, all of the first, second and third lens groups are moved in a direction of an optical axis of the zoom lens,
wherein a focusing operation is carried out by moving the third lens group in the direction of the optical axis of the zoom lens, and
wherein the following expression is satisfied, $$0 < (D_{23T} - D_{23W})/(D_{12W} - D_{12T}) < 0.22$$

where $D_{12W}$ represents a distance between the first and second lens groups at a wide angle end position, $D_{23W}$ represents a distance between the second and third lens groups at the wide angle end position, $D_{12T}$ represents a distance between the first and second lens groups at a telephoto end position, $D_{23T}$ represents a distance between the second and third lens groups at the telephoto end position.

21. A video camera including a zoom lens comprising, in the order named from an object side:
(a) a first lens group having a negative focal length;
(b) an aperture-stop;
(c) a second lens group having a positive focal length; and
(d) a third lens group having a positive focal length,
wherein when a magnification is varied from the wide angle end position to the telephoto end position, all of the first, second and third lens groups are moved in a direction of an optical axis of the zoom lens,
wherein a focusing operation is carried out by moving the third lens group in the direction of the optical axis of the zoom lens, and
wherein the following expression is satisfied, $$0 < (D_{23T} - D_{23W})/(D_{12W} - D_{12T}) < 0.22$$

where $D_{12W}$ represents a distance between the first and second lens groups at a wide angle end position, $D_{23W}$ represents a distance between the second and third lens groups at the wide angle end position, $D_{12T}$ represents a distance between the first and second lens groups at a telephoto end position, $D_{23T}$ represents a distance between the second and third lens groups at the telephoto end position.

* * * * *

UNITED STATES PATENT AND TRADEMARK OFFICE
CERTIFICATE OF CORRECTION

PATENT NO. : 6,243,213 B1
DATED : June 5, 2001
INVENTOR(S) : Nobuyoshi Mori

It is certified that error appears in the above-identified patent and that said Letters Patent is hereby corrected as shown below:

<u>Title page,</u>
Item [57], ABSTRACT,
Line 13, "Includes" should read -- includes --.

<u>Column 13, claim 7,</u>
Line 44, "focal length," should read -- focal length; --.

<u>Column 14, claim 11,</u>
Line 35, "two positive lens" should read -- two positive lenses --.

<u>Column 14, claim 13,</u>
Line 63, "fr represents" should read -- fT represents --.

<u>Column 15, claim 14,</u>
Line 14, "positioned closed" should read -- positioned closest --.

Signed and Sealed this

Ninth Day of April, 2002

Attest:

*Attesting Officer*

JAMES E. ROGAN
*Director of the United States Patent and Trademark Office*